(12) United States Patent
Nozumi et al.

(10) Patent No.: US 6,237,949 B1
(45) Date of Patent: May 29, 2001

(54) AIR BAG SYSTEM FOR MOTOR VEHICLE

(75) Inventors: Shigeyuki Nozumi, Anjo; Ryosuke Yamamoto, Nagoya, both of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/344,687

(22) Filed: Jun. 25, 1999

(30) Foreign Application Priority Data

Jun. 25, 1998 (JP) .................................................. 10-178902

(51) Int. Cl.[7] .................................................. B60R 21/32
(52) U.S. Cl. ........................ 280/735; 280/732; 280/743.1
(58) Field of Search ................... 280/728.1, 731, 280/732, 736, 743.1, 743.2, 742, 735

(56) References Cited

U.S. PATENT DOCUMENTS

| | | | |
|---|---|---|---|
| 3,747,953 | * 7/1973 | Goes et al. ............................. | 280/739 |
| 5,709,405 | * 1/1998 | Saderholm et al. .................. | 280/736 |
| 5,743,558 | * 4/1998 | Seymour ............................... | 280/739 |
| 5,833,265 | * 11/1998 | Seymour ............................... | 280/743.1 |
| 5,899,494 | * 5/1999 | Lane, Jr. ............................... | 280/739 |

* cited by examiner

Primary Examiner—Paul N. Dickson
Assistant Examiner—Faye M. Fleming
(74) Attorney, Agent, or Firm—Rossi & Associates

(57) ABSTRACT

An air bag system for a motor vehicle is provided in which an air bag module is disposed inside a lid provided at a certain location within a vehicle compartment, such that the air bag module stores an inflator operable to generate high-pressure gas and an air bag in a folded state within a reaction can. The air bag system further includes a retainer that is selectively placed in a position to engage with a side portion of the air bag and a position to release the air bag, and a control device that places the retainer in one of the engaging position and releasing position. When the retainer is placed in the position to engage with the side portion of the air bag, the air bag deploys to a smaller size as compared with the size of the air bag deployed when the retainer is placed in the position to release the air bag.

7 Claims, 6 Drawing Sheets

AIR BAG SYSTEM FOR MOTOR VEHICLE

FIELD OF THE INVENTION

The present invention relates to an air bag system for a motor vehicle, which is installed within a vehicle compartment of an automobile and serves to restrain a vehicle occupant upon a collision of the vehicle so as to protect the occupant from an impact applied thereto.

BACKGROUND OF THE INVENTION

A known example of air bag system for a motor vehicle, in particular, an air bag system for the passenger seat, is illustrated in FIG. 8. As shown in FIG. 8, a lid 3 is provided for closing an opening 2 formed through an instrument panel 1 on the side of the passenger seat in the vehicle compartment, and an air bag module 4 is stored inside the lid 3.

The air bag module 4 is principally composed of the lid 3, an air bag 5, an inflator 6, and a reaction can 7. Inside the instrument panel 1, the air bag module 4 is mounted on a vehicle body such that the reaction can 7 is fixed to a deck cross pipe 9 which is a constituent member of the vehicle body.

The inflator 6 is adapted to generate high-pressure gas in response to a signal from an ECU (not shown), and the air bag 5 that is normally folded in the opening portion of the reaction can 7 is caused to open the lid 3 and deploy toward the passenger seated in the vehicle compartment, utilizing the gas generated by the inflator 6.

An impact detection sensor is connected to the ECU, which generates a signal to cause the inflator 6 to generate high-pressure gas upon detection of an impact of not smaller than a predetermined or threshold value. The air bag 5 deploys when an impact equal to or greater than the predetermined value is applied to the vehicle, and starts contacting with the upper part of the body of the passenger at the point of time when the air bag 5 deploys to the full extent. The air bag 5 then restrains the upper part of the body while gradually contracting with the gas being discharged through a vent hole 5a provided at a side portion of the air bag 5 for controlling the pressure within the air bag, thereby to alleviate or reduce the impact applied to the passenger.

Where the passenger is seated close to the instrument panel, however, the air bag comes into contact with the passenger before it deploys to the full extent, and the impact applied to the passenger becomes large since the air bag deploys to the full extent after contacting with the passenger. In such a case, the air bag cannot satisfactorily provide an intended or desired effect.

In a known air bag system as disclosed in Japanese laid-open Patent Publication (Kokai) No. 4-92738, where the vehicle collides with an obstacle while running at a speed equal to or lower than a predetermined speed, the air bag module as a whole is moved further into the inside of the instrument panel (in the traveling direction of the vehicle), so that the size of the air bag that deploys outwardly of the instrument panel is reduced to be smaller than that in normal use. With this technology disclosed in the above-identified publication, however, the magnitude of deployment of the air bag into the vehicle compartment upon actuation of the air bag can be reduced to be smaller than that in normal use only when the collision occurs at a vehicle speed equal to or lower than the predetermined speed, and the above-described problem that occurs when the passenger is seated close to the instrument panel cannot be solved. Furthermore, a glove box, and the like, are provided in the vicinity of the air bag within the instrument panel, leaving no extra space, and it is therefore difficult to move the whole air bag module further into the inside of the instrument panel.

SUMMARY OF THE INVENTION

The present invention has been developed to solve the above-described problems encountered in known air bag systems for motor vehicles. It is therefore an object of the invention to provide an air bag system for a motor vehicle, which provides variations in the shape of deployment of an air bag with a simple structure, so as to achieve the optimum state of restraining a vehicle occupant upon collision of the vehicle.

To accomplish the above object, the present invention provides an air bag system for a motor vehicle, comprising: an air bag module provided within a vehicle compartment and comprising an air bag that is normally in a folded state, and an inflator operable to generate high-pressure gas and inject the high-pressure gas into the air bag; an impact sensor that detects an impact upon collision of the vehicle; an inflator control device that causes the inflator to generate the high-pressure gas when said impact sensor detects an impact that satisfies a predetermined condition, so as to deploy the air bag toward a vehicle occupant in the vehicle compartment; a retainer that is placed in a selected one of a first position to engage with a side portion of the air bag, and a second position to release the side portion of the air bag, the retainer restricting an amount of deployment of the air bag when the retainer is placed in the first position; and a retainer control device that controls the retainer to be placed in one of the first position to engage with the side portion of the air bag, and the second position to release the side portion of the air bag.

BRIEF DESCRIPTION OF THE DRAWINGS

The invention will be described in greater detail with reference to a preferred embodiment thereof and the accompanying drawings, wherein

FIGS. 7(a) and 7(b) are cross-sectional views as seen in the direction of arrows V—V in FIG. 5, wherein FIG. 7(a) shows flow of gas emitted when an air bag deploys to the larger extent, and FIG. 7(b) shows flow of gas emitted when the air bag deploys to the smaller extent.

DETAILED DESCRIPTION OF THE PREFERRED EMBODIMENTS

Figure 1:
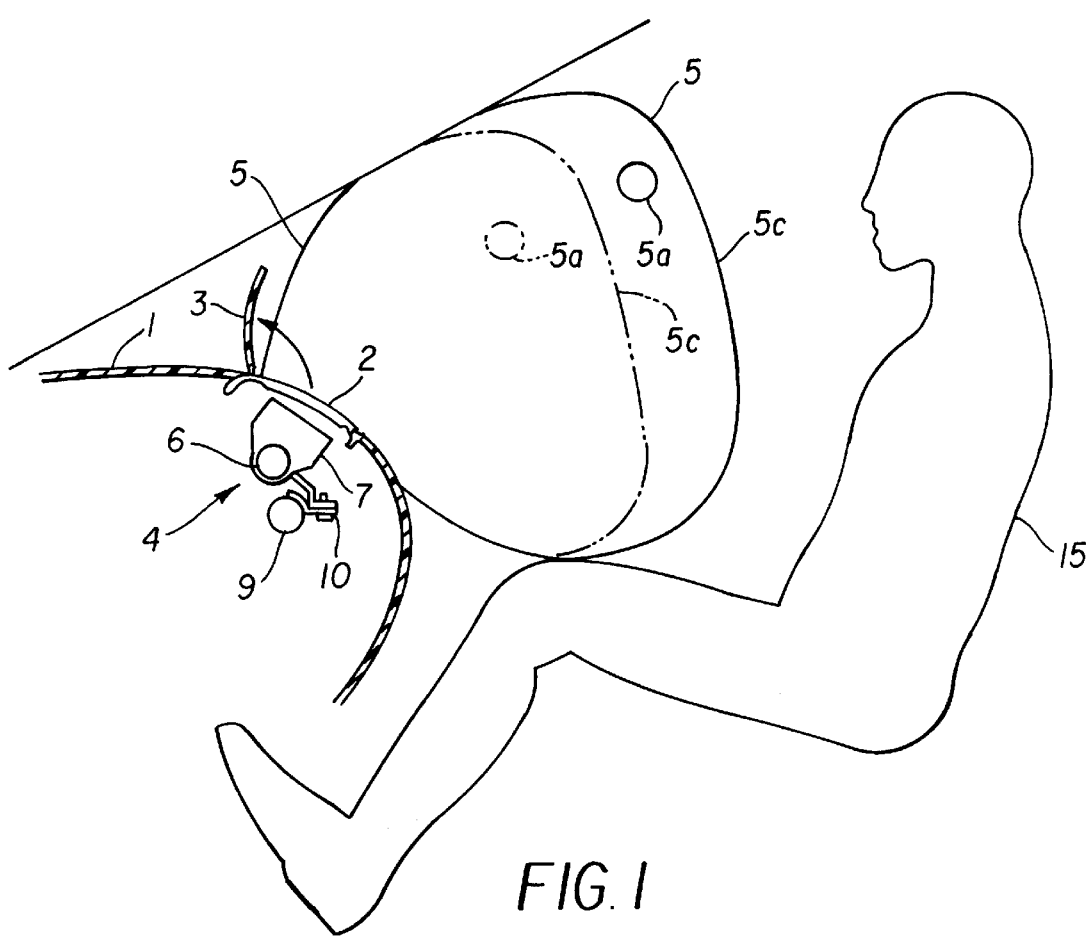
FIG. 1 is a schematic view showing an air bag system for a motor vehicle according to one embodiment of the present invention.
Figure 2:
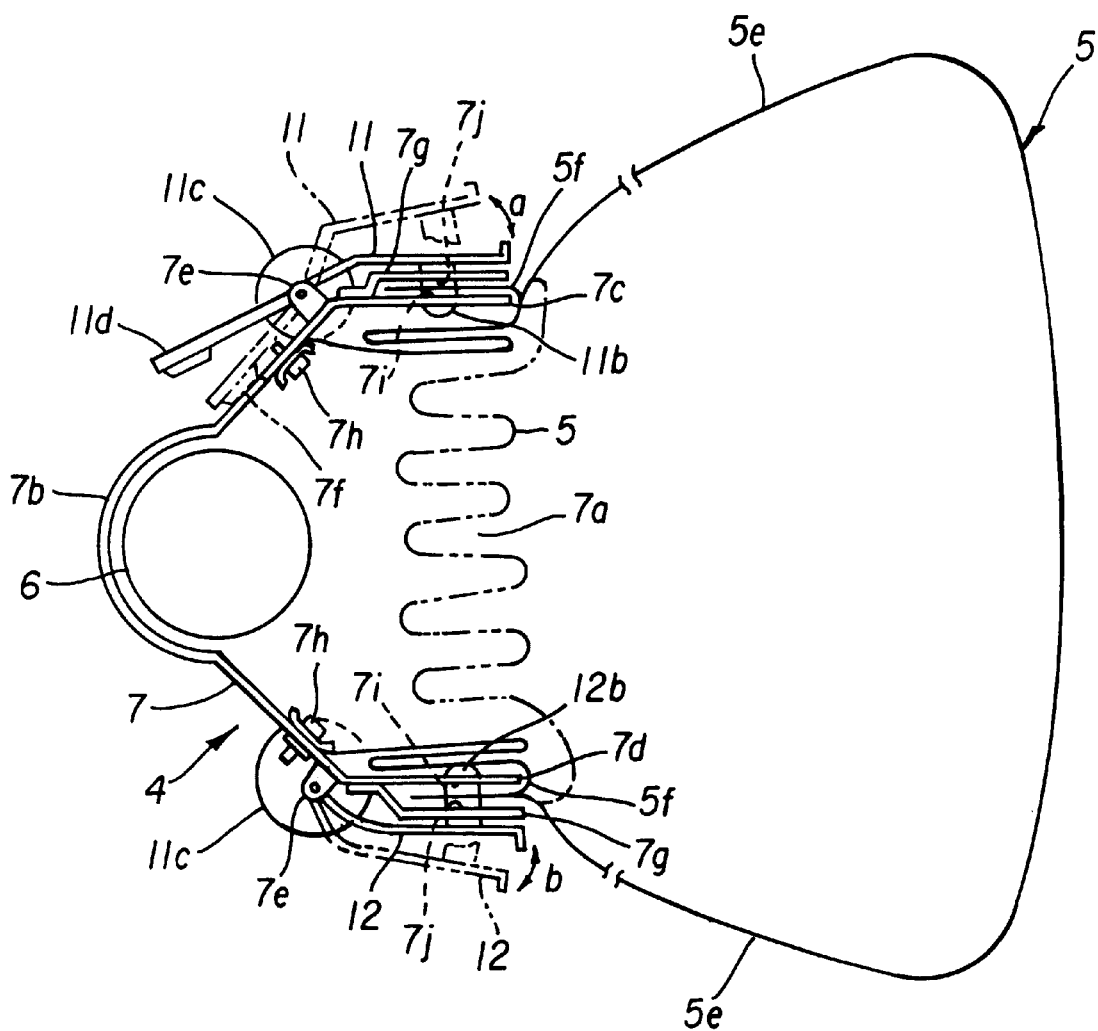
FIG. 2 is a cross-sectional view showing one operating state of the vehicle air bag system of the embodiment of FIG. 1.
Figure 3:
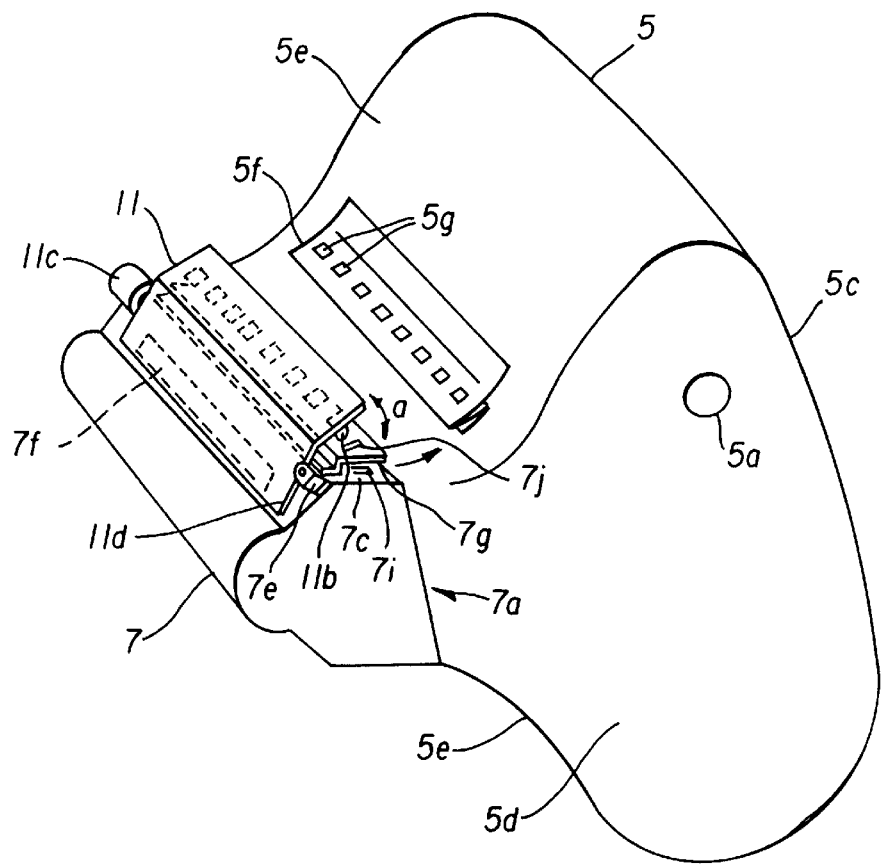
FIG. 3 is a perspective view of an air bag module of the air bag system of FIG. 1.
Figure 8:
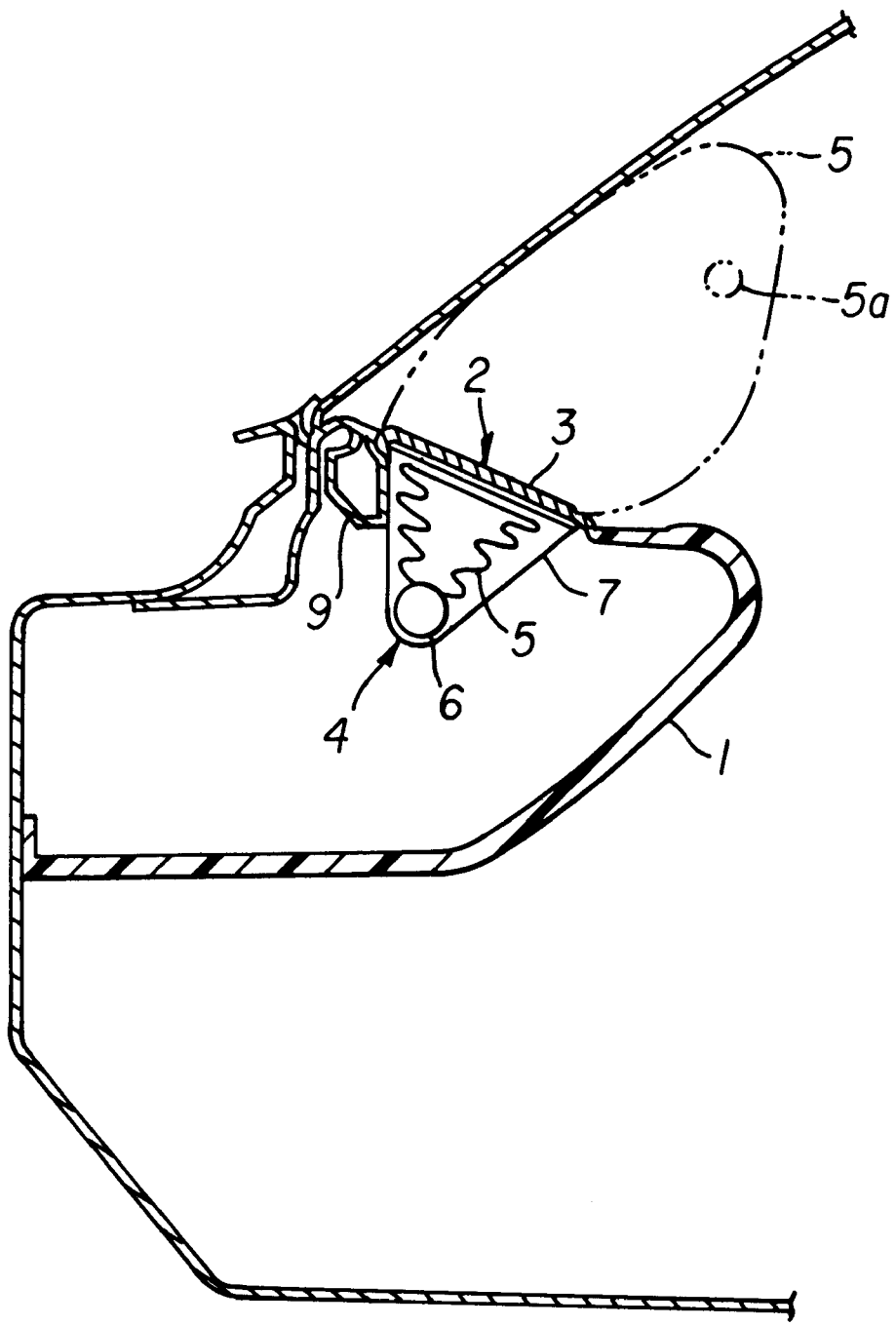
FIG. 8 is a view showing the construction of a known air bag system for a motor vehicle.

Referring to the accompanying drawings, one preferred embodiment of the present invention will be described in detail in which the present invention is applied to an air bag system for the passenger seat. In FIG. 1 through FIG. 3, the same reference numeral as used in FIG. 8 will be used to identify the same or substantially the same components as used in the known system of FIG. 8, and no detailed description will be provided for these components.

FIG. 1 is a cross-sectional view showing the air bag system of the present embodiment provided on the side of the passenger seat in the vehicle compartment. As shown in FIG. 1, a lid 3 is provided so as to close an opening 2 formed through an instrument panel 1. An air bag module 4 is located inside the lid 3, and fixed to a deck cross pipe 9 via a bracket 10.

In the present embodiment, a reaction can 7 that serves as a case of the air bag module 4 defines a passage through which an air bag 5 and an inflator 6 communicate with each other. As shown in FIG. 2 and FIG. 3, the reaction can 7 is provided with two hinges 7e, 7e disposed on substantially central parts of its upper face 7c and lower face 7d, respectively, and two plates 7g, 7g that extend in parallel with the upper face 7c and the lower face 7d, respectively. An aperture 7f is formed through the upper face of the reaction can 7 in the vicinity of the inflator 6, such that the aperture 7f communicates with the exterior and interior of the reaction can 7. A plurality of slits 7i are formed through the upper and lower faces 7c, 7d of the reaction can 7, at certain intervals in the direction of the width of the can 7, and a plurality of slits 7j are formed through the plates 7g, 7g at their positions corresponding to those of the slits 7i.

A retainer 11 having a generally V-shaped cross section is supported at a substantially middle portion thereof by a pin of the hinge 7e disposed on the upper side, such that the retainer 11 may pivot about the hinge 7e as indicated by the arrow "a". A plurality of retainer pins 11b that protrude toward the inside of the reaction can 7 are formed on one end portion of the retainer 11 on the side of the opening of the can 7, such that the retainer pins 11b are arranged in the width direction at the same intervals as the slits 7i and slits 7j. When the retainer 11 is placed in the closed position as indicated by a solid line in FIG. 2, the pins 11b pass through the slits 7j and slits 7i. Also, the retainer 11 includes an extended portion 11d that is located closer to the inflator 6 with respect to the hinge 7e, such that the extended portion 11d is adapted to close the aperture 7f of the reaction can 7 when the retainer 11 pivots from the closed position, into its open position as indicated by a two-dot chain line in FIG. 2.

On the other hand, a retainer 12 having a generally V-shaped cross section is supported at one end portion thereof by a pin of the hinge 7e disposed on the lower face of the reaction can 7, and the other end portion of the retainer 12 extends toward the opening 7a of the reaction can 7. The retainer 12 may pivot about the pin of the hinge 7e as indicated by the arrow "b" in FIG. 2. Similarly to the retainer 11 on the upper side, a plurality of retainer pins 12b that protrude toward the inside of the reaction can 7 are formed on the retainer 12 and arranged in the width direction, such that the pins 12b pass through the slits 7j and slits 7i on the side of the lower face when the retainer 12 is in the closed position as indicated by a solid line in FIG. 2.

The retainers 11, 12 as described above are respectively driven by motors 11c, 11c that are controlled by an ECU 8 as described later.

As shown in FIG. 3, rectangular flaps 5f, 5f made from the same flexible woven cloth as used for the air bag 5 are sewn to the upper and lower surfaces (upper and lower side portions) 5e, 5e of the air bag 5. A plurality of holes 5g are formed through each of the flaps 5f such that the holes 5b are arranged in the width direction at the same intervals as the slits 7i of the reaction can 7.

As shown in FIG. 2, an edge of the air bag 5 on the side of the reaction can 7 is fixed to the reaction can 7 by means of bolts 7h, 7h. While the air bag 5 is stored in the folded state as indicated by a two-dot chain line in FIG. 2, the flaps 5f, 5f are inserted between the upper and lower faces 7c, 7d of the reaction can 7 and the plates 7g, 7g, respectively, and the retainer pins 11b, 12b are inserted through the holes 5g, 5g of the flaps 5f, 5f.

Figure 4:
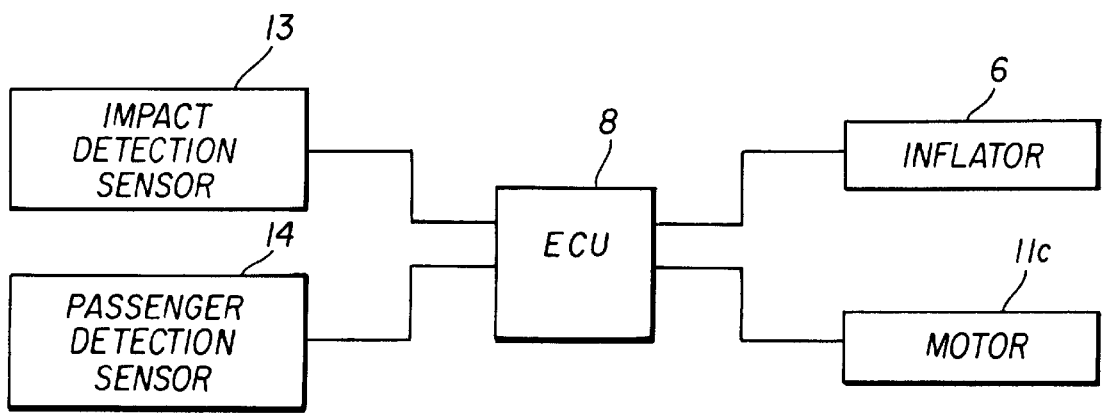
FIG. 4 is a control block diagram showing a control system of the air bag system of FIG. 1.

FIG. 4 is a control block diagram of the vehicle air bag system of the present embodiment. The ECU 8 receives signals from an impact detection sensor 13 that detects an impact mainly applied to the vehicle body from the front side thereof, and a passenger detection sensor 14 that detects the distance between the passenger 15 and the instrument panel (namely, the seated state of the passenger), utilizing an electromagnetic wave or sound wave. In response to the signals from these sensors, the ECU 8 generates appropriate signals to the inflator 6 that generates high-pressure gas so as to deploy the air bag, and the motors 11c for driving the retainers 11, 12.

When the impact detection sensor 13 detects an impact equal to or greater than a predetermined or threshold value, the ECU 8 generates a signal to the inflator 6 to cause it to generate high-pressure gas, and at the same time controls the retainers 11, 12 based on the output of the passenger detection sensor 14.

Where the passenger detection sensor 14 detects the passenger 15 seated in the normal position or at a position sufficiently remote from the instrument panel upon detection of an impact, the ECU 8 drives the motors 11c, 11c to place the retainers 11, 12 in the open positions, thereby to pull the pins 11b, 12b out of the holes 5g, 5g of the air bag 5 to release the flaps 5f, 5f.

When the passenger detection sensor 14 detects the passenger seated close to the instrument panel 1 upon detection of an impact, the ECU 8 does not drive the motors 11c, 11c, so that the retainers 11, 12 are held in the closed positions as indicated by the solid lines in FIG. 2, in which the pins 11b, 12b are inserted through the holes 5g, 5g for engagement with the flaps 5f, 5f.

If an impact is applied to the vehicle body while the passenger 15 is seated at a suitable distance apart from the instrument panel (in the normal seated state), the air bag 5 deploys with the flaps 5f, 5f being released, to substantially the same size as a general air bag for the passenger seat having a generally pyramidal shape with a rectangular base and a volume of about 1000 liters, for example, as shown in FIG. 1 (solid line) and FIG. 3. If an impact is applied to the vehicle body while the passenger 15 is seated close to the instrument panel, the air bag 5 deploys with the flaps 5f, 5f held in engagement with the retainer pins 11b, 12b, to the smaller extent as compared with the case where the flaps 5f, 5f are released, as indicated by a two-dot chain line in FIG. 1. For example, the air bag 5 deploys into a substantially pyramidal shape with a rectangular base and a volume of about 800 liters. Where the air bag 5 deploys with the flaps 5f, 5f thus retained by the retainers 11, 12, the bottom face 5c of the air bag that faces the passenger 15 is retracted, e.g., about 100 mm, from the solid-line position to be reached when the flaps 5f, 5f are released, toward the instrument panel 1, as shown in FIG. 1.

Where the air bag module 4 deploys to the smaller extent, part of the gas flows out through the aperture 7f of the reaction can 7 since the extended portion 11d of the retainer 11 is disengaged or released from the aperture 7f, and the gas also flows out through the aperture 7f when the air bag 5 contracts after contacting with the passenger. Where the air bag module 4 deploys to the larger extent, the aperture 7f of the reaction can 7 is closed by the extended portion 11d of the retainer 11, and all of the gas flows into the interior of the air bag, without flowing out through the aperture 7f upon contact of the air bag 5 with the passenger. Thus, the amount of gas flowing into the air bag 5 may be adjusted depending upon the shape of deployment of the air bag 5, and the pressure within the air bag 5 can be controlled to a constant level.

Upon application of an impact equal to or greater than the threshold value, therefore, the shape of the air bag 5 may be changed in accordance with the seated state or position of the passenger 15 at the time of detection of the impact, without changing the pressure within the air bag 5. Thus, the air bag 5 of the present embodiment is able to optimally restrain the passenger 15, assuring significantly improved safety of the passenger 15.

In the illustrated embodiment, the pressure within the air bag upon deployment thereof is controlled by selectively opening or closing the aperture 7f formed through the reaction can 7 by means of the extended portion 11d of the retainer 11. Instead of this arrangement, the inflator 6 may consist of an output variable inflator capable of changing the amount of gas to be generated, in response to a signal from the ECU 8, so as to keep the pressure within the air bag constant irrespective of the shape of deployment of the air bag 5. More specifically, the amount of the gas generated by the inflator is increased when the air bag 5 is desired to deploy to the larger extent, and is reduced when the air bag 5 is desired to deploy to the smaller extent. With this arrangement, too, the air bag 5 is able to suitably restrain the passenger, assuring significantly improved safety of the passenger.

The output variable inflator as described above may be used in combination with the aperture 7f and the extended portion 11d, so as to keep the pressure within the air bag constant. In this case, too, the air bag is able to appropriately restrain the passenger, assuring significantly improved safety of the passenger.

The passenger detection sensor 14 used in the illustrated embodiment for directly measuring the distance between the passenger 15 and the instrument panel 1 may be replaced by a sensor for detecting the adjusted position (in the front-to-end direction of the vehicle) of the seat on which the passenger 15 sits, and the retainers 11, 12 may be controlled based on the result of detection of this sensor. In this case, too, the air bag is able to fulfill a desired restraint function according to the seated position of the passenger 15, assuring improved safety of the passenger at a reduced cost by use of a relatively simple sensor.

The passenger detection sensor may also be adapted to detect the weight of the passenger 15 from the distribution of pressure applied to the seat, so that the ECU 6 can estimate body dimensions of the passenger 15, and control the shape of deployment of the air bag 5 based on the estimated body dimensions as well as the seated position of the passenger 15, to thus achieve an appropriate passenger restraint function. More specifically, the retainers 11, 12 are held in the closed positions where a small person is seated, so as to reduce the size of the air bag 5 when it is deployed.

It is also possible to detect whether the passenger 15 is wearing a seat belt or not, and open only the retainer 11 when it is detected that the passenger 15 wears the seat belt, thereby to suitably restrain the head and chest of the passenger 15.

Instead of using the output of the passenger detection sensor 14, a switch may be provided which is operated for selecting the manner of deployment of the air bag 5 from, for example, a large-deployment mode, a small-deployment mode and a no-deployment mode. The ECU drives the retainers 11, 12 based on the position of the switch selected by the passenger 15, so as to change the shape of deployment of the air bag 5. In this case, the passenger detection sensor may be eliminated, and only a simple, inexpensive structure is required to suitably restrain the passenger 15, assuring significantly improved safety of the passenger.

Referring next to FIG. 5, FIG. 6, and FIGS. 7(a) and 7(b), another embodiment of the present invention will be described in which the motor 11c as used in the illustrated embodiment is replaced by another structure for driving the retainers 11, 12. In these figures, the same reference numerals as used in FIG. 1 through FIG. 4 will be used for identifying corresponding components, of which no detailed description will be provided.

Figure 5:
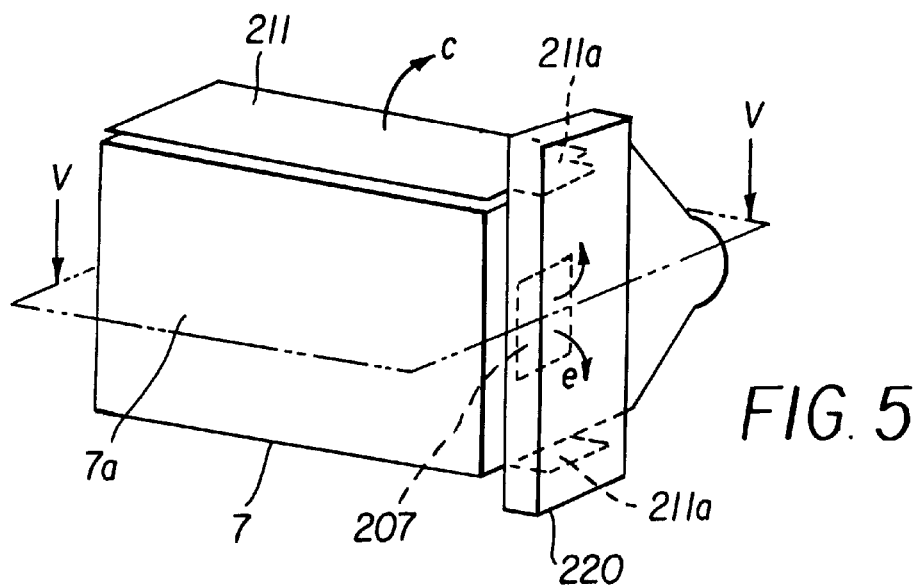
FIG. 5 is a perspective view showing another embodiment of the present invention.
Figure 6:
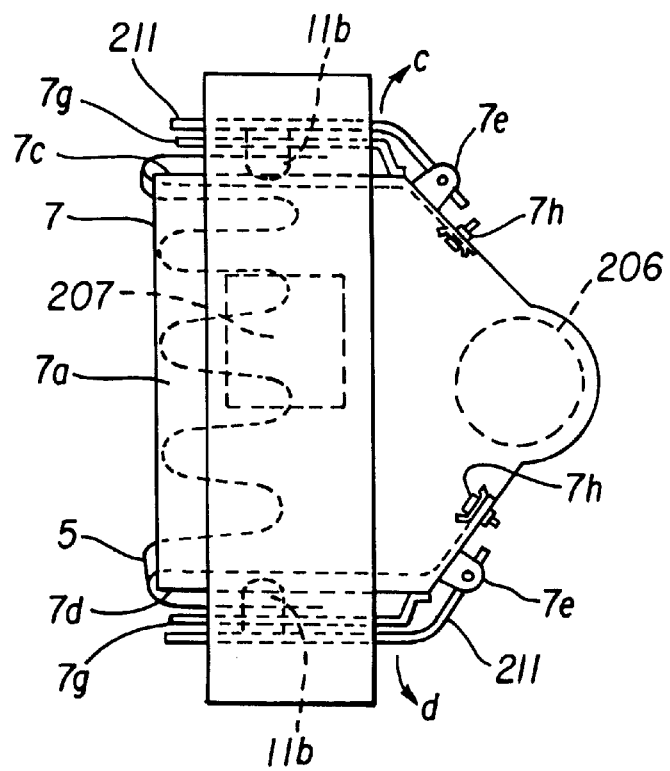
FIG. 6 is a cross-sectional view showing one side of the air bag system of FIG. 5 on which a diffuser is located.

As shown in FIG. 5 and FIG. 6, the reaction can 7 is provided with hinges 7e, 7e disposed on substantially central parts of its upper face 7c and lower face 7d, respectively, and plates 7g, 7g disposed on the opening sides of the upper face 7c and the lower face 7d, respectively, as in the previous embodiment. A plurality of slits 7i are formed through the upper and lower faces 7c, 7d of the reaction can 7, at certain intervals in the direction of the width of the can 7, and a plurality of slits 7j are formed through the plates 7g, 7g at their positions corresponding to those of the slits 7i. Also, retainers 211, 211 each having a generally V-shaped cross section are supported at one end portion thereof by respective pins of the hinges 7e, 7e provided on the upper and lower faces 7c, 7d of the reaction can 7, and the other end portions of the retainers 211, 211 extend toward the opening 7a of the can 7. The retainers 211, 211 may pivot about the hinges 7e, 7e in the directions as indicated by arrows "c", "d", respectively. A plurality of retainer pins 11b, 11b that protrude toward the inside of the reaction can 7 are provided at the end portions of the retainers 211, 211 on the side of the opening of the reaction can 7, such that the retainer pins 11b are arranged in the width direction at the same intervals as the slits 7i, 7j. When the retainers 211, 211 are placed in the closed positions as shown in FIG. 6, the pins 11b, 11b pass through the slits 7j, 7j and slits 7i, 7i.

As in the previous embodiment shown in FIG. 3, rectangular flaps 5f, 5f made from the same flexible woven cloth as used for the air bag 5 are sewn to the upper and lower surfaces (upper and lower side portions) 5e, 5e of the air bag 5. A plurality of holes 5g are formed through each of the flaps 5f such that the holes 5b are arranged in the width direction at the same intervals as the slits 7i and slits 7j. An edge of the air bag 5 on the side of the reaction can 7 is fixed to the reaction can 7 by means of bolts 7h, 7h. While the air bag 5 is stored in the folded state as indicated by a dotted line in FIG. 6, the flaps 5f, 5f are inserted between the upper and lower faces 7c, 7d of the reaction can 7 and the plates 7g, 7g, respectively, and the retainer pins 11b, 11b are inserted through the holes 5g, 5g of the flaps 5f, 5f.

Figure 7A:
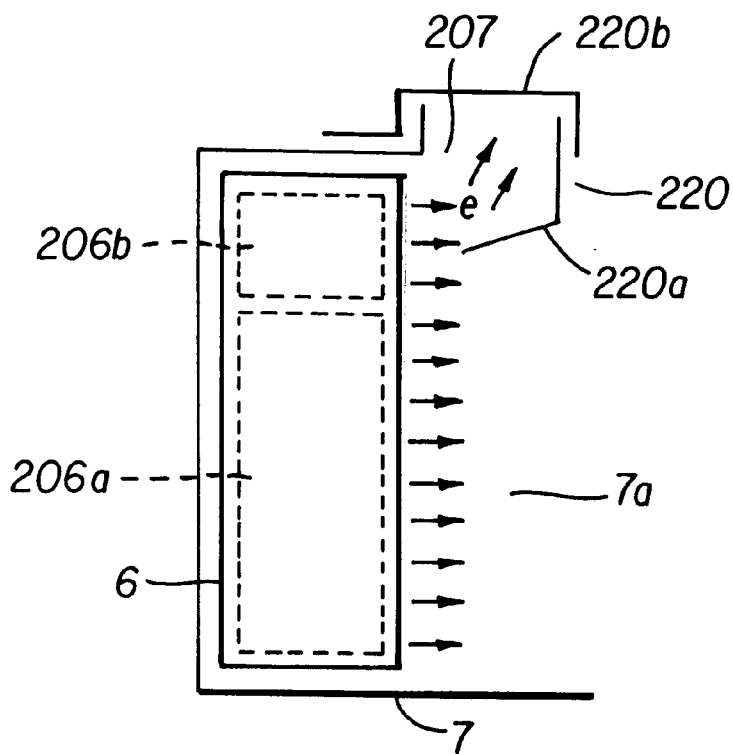
Figure 7B:
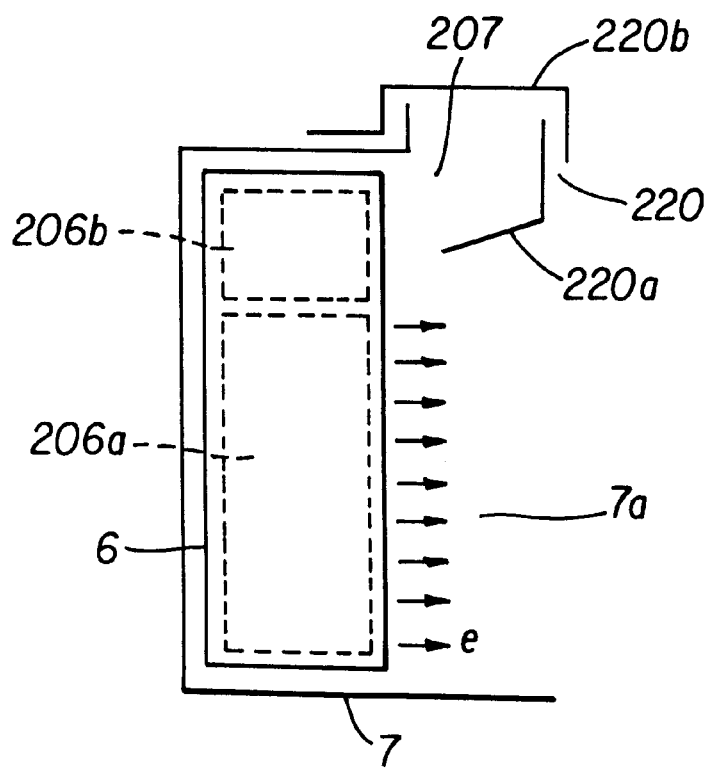

The reaction can 7 is provided at one end as viewed in the width direction with a side opening 207 and a diffuser 220, as shown in FIG. 5. The diffuser 220 is composed of an inner diffuser 220a and an outer diffuser 220b, as shown in FIGS. 7(a) and 7(b) that are cross-sectional views taken along V—V line in FIG. 5. The inner diffuser 220a is disposed in the inside of the reaction can 7, and forms a flow path that guides part of the gas generated by an output variable inflator 206 (which will be described later) from the side opening 207 to the outside of the can 7 as indicated by arrows "e". The outer diffuser 220b forms a flow path that guides the gas that has been led by the inner diffuser 220a to the outside of the reaction can 7, in the vertical direction along the side face of the reaction can 7. On the other hand, the retainers 211, 211 provided on the upper and lower sides of the reaction can 7 have end portions on the side of the diffuser 220, which are formed with sidewise extended portions 211a, 211a that are extended into the inner space of the outer diffuser 220b. The sidewise extended portions 211a, 211a serve to block the flow path of the gas guided by the diffuser 220.

The air bag system of the present embodiment uses an inflator 206 in the form of an output variable inflator capable of adjusting the range of emission of gas and the amount of gas to be generated, in response to a signal received from the ECU 8. More specifically, the output variable inflator 6 is able to generate or emit gas from a selected one of a first region 206a and the total of the first region 206a and a second region 206b. It is to be noted that the amount of generated gas varies with the range of emission of the gas.

Under the conditions for deploying the air bag 4 to the larger extent, high-pressure gas is generated from the entire region (206a, 206b) of the inflator, as shown in FIG. 7(a). At this time, part of the gas is led from the inner diffuser 220a to the outer diffuser 220b, to lift up the sidewise extended portions 211a, 211a of the retainers 211, 211. As a result, the retainers 211, 211 are opened, and the retainer pins 11b, 11b are pulled out of the flaps 5f, 5f, so that the air bag 5 deploys to the large or full extent.

Under the conditions for deploying the air bag 5 to the smaller extent, high-pressure gas is generated only from the first region 206a of the inflator 6, as shown in FIG. 7(b). As a result, substantially no gas is guided into the diffuser 220, and the sidewise extended portions 211a, 211a of the retainers 211, 211 are not lifted up, with the result that the retainers 211, 211 are kept closed. Consequently, the air bag 5 deploys only to the smaller extent, with the flaps 5f, 5f held in engagement with the pins 11b, 11b.

Since the retainers 211, 211 are actuated by the gas generated by the inflator 6, only a simple mechanism is required to vary the deployment state of the air bag 5 to a great extent, so as to optimally restrain the passenger 15. Also, since the output of the inflator 206 is controlled to achieve a desired deployment state of the air bag 5, the pressure within the air bag 5 may be controlled to a constant level during the high-output and low-output operations of the inflator 206. Thus, the air bag system of the present embodiment is able to suitably restrain the passenger 15 irrespective of the size of the air bag 5 when it is deployed, thus assuring significantly improved safety of the passenger.

What is claimed is:

1. An air bag system for a motor vehicle, comprising:
   an air bag module provided within a vehicle compartment, said air bag module comprising an air bag that is normally in a folded state, and an inflator operable to generate high-pressure gas and inject the high-pressure gas into the air bag;
   an impact sensor that detects an impact upon collision of the vehicle;
   an inflator control device that causes the inflator to generate the high-pressure gas when said impact sensor detects an impact that satisfies a predetermined condition, so as to deploy said air bag toward a vehicle occupant in the vehicle compartment;
   a retainer that is placed in a selected one of a first position to engage with a side portion of the air bag, and a second position to release the side portion of the air bag, said retainer restricting an amount of deployment of the air bag when the retainer is placed in the first position; and
   a retainer control device that controls said retainer to be placed in one of said first position to engage with the side portion of the air bag, and said second position to release the side portion of the air bag.

2. An air bag system according to claim 1, wherein said air bag deploys to a smaller size when said retainer is placed in said first position to engage with the side portion of the air bag, than that of the air bag deployed when the retainer is placed in said second position to release the side portion of the air bag.

3. An air bag system according to claim 1, further comprising:
   a seated state detecting device that detects a seated state of the vehicle occupant;
   wherein said retainer control device controls said retainer to be placed in one of said first position to engage with the side portion of the air bag and said second position to release the side portion of the air bag, according to an output of said seated state detecting device.

4. An air bag system according to claim 1, wherein said air bag module is formed with a discharge port that is open to a passage between the inflator and the air bag, such that a part of the gas generated by the inflator is allowed to be discharged out of the passage, said air bag system further comprising:
   a valve located over the discharge port, and placed in a selected one of a first position for opening the discharge port, and a second position for closing the discharge port; and
   a valve control device that places said valve in the first position for opening the discharge port when said retainer engages with the side portion of the air bag.

5. An air bag system according to claim 4, wherein said retainer moves as a unit with said valve that may cover the discharge port, such that the valve is placed in the first position for opening the discharge port when the retainer is placed in the first position to engage with the side portion of the air bag, and is placed in the second position for closing the discharge port when the retainer is placed in the second position to release the side portion of the air bag, whereby said retainer control device also works as said valve control device.

6. An air bag system according to claim 1, wherein said air bag module includes a case that stores the inflator and the air bag therein;
   wherein said air bag includes a flap that is attached to the side portion of the air bag, said flap including at least one hole;
   wherein a plate is attached to said case to cooperate with the case to define a gap in which said flap of the air bag can be located, said plate including at least one hole at positions corresponding to said at least one hole of the flap; and
   wherein said retainer is pivotally attached to the case and includes an engaging member at one end thereof, said engaging member being able to engage with said at least one hole of said plate and said at least one hole of said flap as a result of pivotal movement of the retainer, so as to restrict displacement of the flap.

7. An air bag system according to claim 1, wherein said inflator includes a plurality of gas outlets, said inflator control device being able to prevent the gas from being emitted from a part of the gas outlets; said air bag system further comprising:

a discharge passage through which the gas is guided from said part of the gas outlets to an outside of the air bag module; and a movable member provided within said discharge passage and movable as a unit said retainer, said movable member being movable along the discharge passage so as to close the discharge passage, and placing said retainer in the second position to release the side portion of the air bag when the gas emitted from the inflator is guided into the discharge passage.

* * * * *